United States Patent
Seth et al.

(10) Patent No.: US 12,547,663 B2
(45) Date of Patent: Feb. 10, 2026

(54) DYNAMIC THRESHOLD-BASED RECORDS LINKING

(71) Applicant: International Business Machines Corporation, Armonk, NY (US)

(72) Inventors: Abhishek Seth, Deoband (IN); Soma Shekar Naganna, Bengaluru (IN); Devbrat Sharma, Bengaluru (IN); Mahendra Singh Kanyal, Banbasa (IN)

(73) Assignee: International Business Machines Corporation, Armonk, NY (US)

(*) Notice: Subject to any disclaimer, the term of this patent is extended or adjusted under 35 U.S.C. 154(b) by 115 days.

(21) Appl. No.: 17/808,740

(22) Filed: Jun. 24, 2022

(65) Prior Publication Data

US 2023/0418877 A1    Dec. 28, 2023

(51) Int. Cl.
*G06F 16/906*    (2019.01)

(52) U.S. Cl.
CPC .................. *G06F 16/906* (2019.01)

(58) Field of Classification Search
CPC ..................................... G06F 16/906
USPC ...................................... 707/738
See application file for complete search history.

(56) References Cited

U.S. PATENT DOCUMENTS

| | | | |
|---|---|---|---|
| 7,685,093 B1* | 3/2010 | Adams | G06F 16/242 707/999.001 |
| 7,912,842 B1* | 3/2011 | Bayliss | G06F 16/215 707/749 |
| 8,150,813 B2* | 4/2012 | Adair | G06F 16/2462 707/706 |
| 8,321,383 B2* | 11/2012 | Schumacher | G06F 16/24556 707/688 |
| 8,370,355 B2* | 2/2013 | Harger | G06F 16/21 707/737 |
| 8,423,525 B2* | 4/2013 | Jonas | G06Q 10/10 706/14 |
| 8,429,220 B2* | 4/2013 | Wilkinson | H04L 67/1065 709/219 |
| 8,510,338 B2* | 8/2013 | Cushman, II | G06F 16/215 707/800 |
| 8,515,987 B1* | 8/2013 | Jain | G06F 16/215 707/808 |

(Continued)

FOREIGN PATENT DOCUMENTS

CN     103748582 A * 4/2014 ....... G06F 17/30303

*Primary Examiner* — Tony Mahmoudi
*Assistant Examiner* — Michael Le
(74) *Attorney, Agent, or Firm* — Yee & Associates, P.C.

(57) ABSTRACT

Records linking is provided. Two records are selected from a plurality of records corresponding to a customer for pair-wise record comparison. It is determined whether the two records are included in different entities. A local auto-link-threshold value of the different entities is identified in response to determining that the two records are included in different entities. An attribute comparison is performed between the two records. A comparison score is generated based on the attribute comparison between the two records. It is determined whether the comparison score is greater than the local auto-link-threshold value of the different entities. The two records are linked in response to determining that the comparison score is greater than the local auto-link-threshold value of the different entities.

20 Claims, 7 Drawing Sheets

(56) References Cited

U.S. PATENT DOCUMENTS

| | | | | |
|---|---|---|---|---|
| 8,713,434 | B2* | 4/2014 | Ford | G06F 16/288 707/758 |
| 10,621,493 | B2* | 4/2020 | Oberhofer | G06N 3/08 |
| 11,106,692 | B1* | 8/2021 | Guetta | G06F 16/248 |
| 11,720,580 | B1* | 8/2023 | Hirsch | G06F 16/2468 707/723 |
| 2008/0243885 | A1* | 10/2008 | Harger | G06F 16/21 |
| 2008/0244008 | A1* | 10/2008 | Wilkinson | H04L 67/56 709/205 |
| 2009/0089332 | A1* | 4/2009 | Harger | G06F 40/197 |
| 2009/0089630 | A1* | 4/2009 | Goldenberg | G06F 16/2462 714/704 |
| 2009/0144070 | A1* | 6/2009 | Psota | G06Q 30/0609 705/330 |
| 2009/0259659 | A1* | 10/2009 | Mericle | G06F 16/20 |
| 2009/0271424 | A1* | 10/2009 | Bayliss | G06F 16/245 |
| 2010/0175024 | A1* | 7/2010 | Schumacher | G06F 16/24556 715/810 |
| 2011/0173093 | A1* | 7/2011 | Psota | G06Q 40/02 705/26.35 |
| 2012/0203576 | A1* | 8/2012 | Bucur | G16H 10/60 705/3 |
| 2012/0203708 | A1* | 8/2012 | Psota | G06Q 30/02 705/347 |
| 2013/0325882 | A1* | 12/2013 | Deshpande | G06F 16/211 707/755 |
| 2014/0279757 | A1* | 9/2014 | Shimanovsky | H04W 4/029 706/12 |
| 2014/0281729 | A1 | 9/2014 | Goldenberg et al. | |
| 2015/0039611 | A1* | 2/2015 | Deshpande | G06F 16/285 707/737 |
| 2015/0106122 | A1* | 4/2015 | Lee | G16H 10/60 705/3 |
| 2015/0127690 | A1* | 5/2015 | Hazlewood | G06F 16/25 707/809 |
| 2016/0012151 | A1* | 1/2016 | Muchinsky | G06F 16/25 707/748 |
| 2016/0034715 | A1* | 2/2016 | Dubov | G06F 21/6227 707/781 |
| 2016/0171075 | A1* | 6/2016 | Erenrich | G06F 16/285 707/738 |
| 2016/0180245 | A1* | 6/2016 | Tereshkov | G06N 20/00 706/12 |
| 2017/0083820 | A1* | 3/2017 | Huang | G06F 16/3346 |
| 2017/0124216 | A1* | 5/2017 | Miller | G16H 10/60 |
| 2017/0193173 | A1* | 7/2017 | Miller | G16H 10/40 |
| 2018/0150486 | A1* | 5/2018 | Hawkes | G06F 16/215 |
| 2018/0365338 | A1* | 12/2018 | Muchinsky | G06F 16/951 |
| 2019/0005118 | A1* | 1/2019 | Tripathi | G06F 16/215 |
| 2020/0218720 | A1 | 7/2020 | Rathore et al. | |
| 2021/0034591 | A1* | 2/2021 | Parkala Srinivas | G06F 16/2379 |
| 2021/0065047 | A1* | 3/2021 | Shi | G06N 3/045 |
| 2021/0224258 | A1 | 7/2021 | Faruquie et al. | |
| 2021/0334295 | A1* | 10/2021 | Zhu | G06F 16/214 |
| 2022/0012219 | A1* | 1/2022 | Pulipaty | G06F 16/288 |
| 2022/0092064 | A1 | 3/2022 | Bremer et al. | |

* cited by examiner

DYNAMIC THRESHOLD-BASED RECORDS LINKING

BACKGROUND

1. Field

The disclosure relates generally to data management and more specifically to dynamically linking records using a local auto-link-threshold value of each respective entity.

2. Description of the Related Art

Data management is the practice of collecting, storing, and utilizing data securely, efficiently, and cost-effectively. Data management is concerned with the end-to-end lifecycle of data, from creation to retirement, and the controlled progression of data to and from each stage within its lifecycle. The goal of data management is to optimize the use of data within the bounds of policy and regulation so that entities, such as, for example, enterprises, businesses, companies, organizations, institutions, agencies, or the like, can make decisions and take actions to maximize benefit to those entities.

Today's entities need a data management solution that provides an efficient way to manage data across diverse data sources. Data management systems are built on data management platforms that can include databases, data lakes, data warehouses, big data management systems, data analytics, and more. All these components work together to deliver the data management capabilities an entity needs for its applications and provide the analytics that use the data generated by those applications.

SUMMARY

According to one illustrative embodiment, a computer-implemented method for records linking is provided. A computer selects two records from a plurality of records corresponding to a customer for pair-wise record comparison. The computer determines whether the two records are included in different entities. The computer identifies a local auto-link-threshold value of the different entities in response to the computer determining that the two records are included in different entities. The computer performs an attribute comparison between the two records. The computer generates a comparison score based on the attribute comparison between the two records. The computer determines whether the comparison score is greater than the local auto-link-threshold value of the different entities. The computer links the two records in response to the computer determining that the comparison score is greater than the local auto-link-threshold value of the different entities. According to other illustrative embodiments, a computer system and computer program product for records linking are provided.

DETAILED DESCRIPTION

Figure 1:
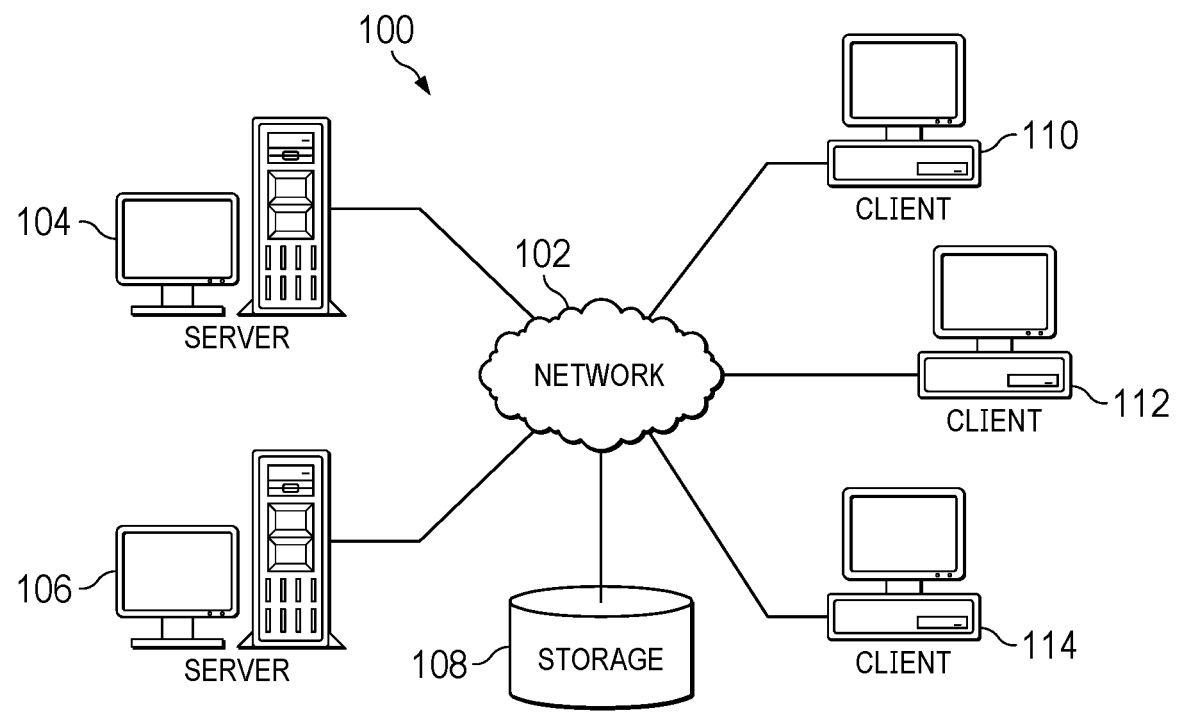
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
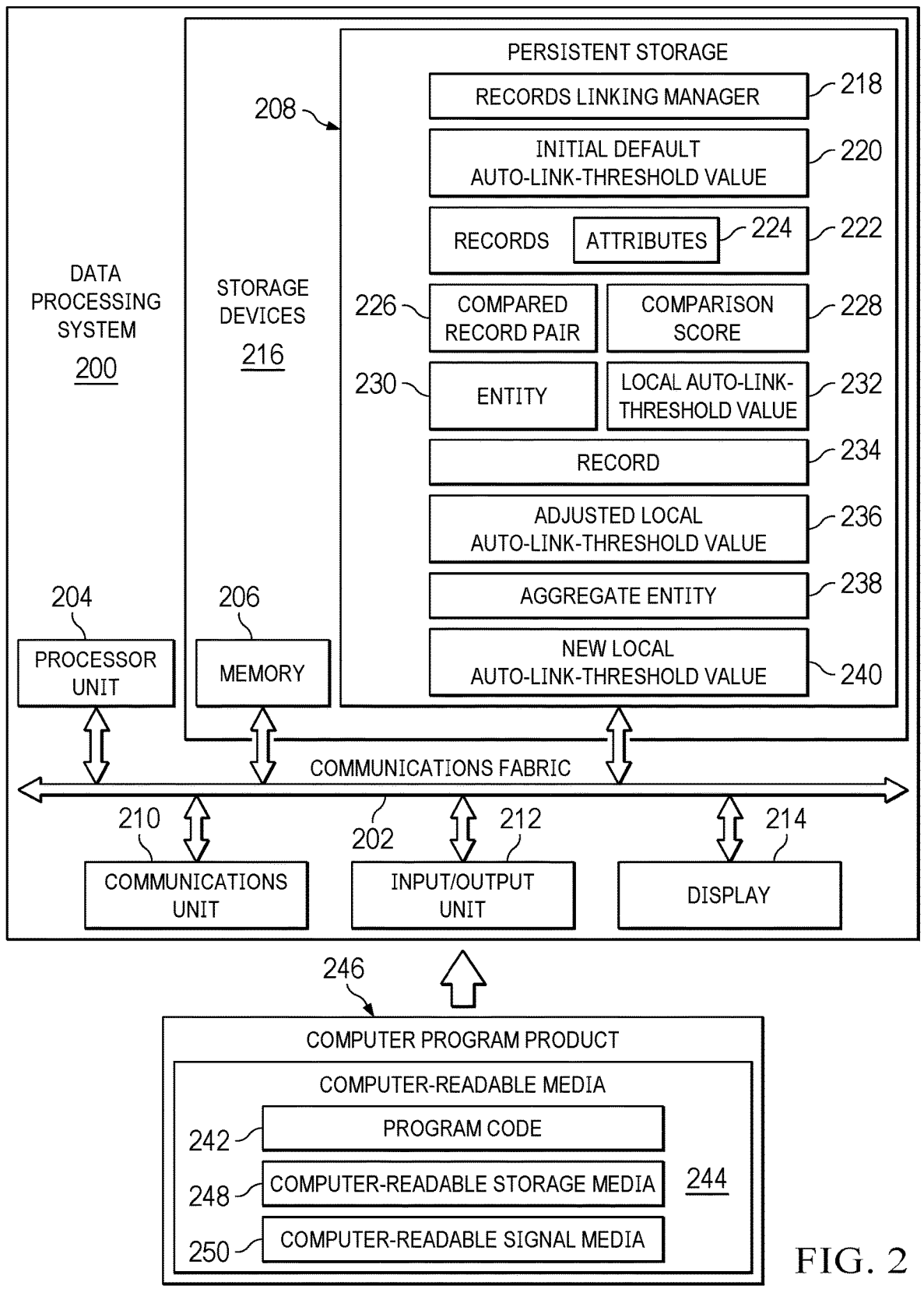
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide a set of data management services to subscribing customers, such as, for example, enterprises, businesses, companies, organizations, institutions, agencies, and the like. Further, server 104 and server 106 match and link data records together according to illustrative embodiments as part of the data management services.

The linking of records is transitive in nature. In other words, if record A is linked to record B and record B is linked to record C, then the three records (i.e., record A, record B, and record C) should be linked together. In other words, record A and record C can be linked without comparing record A to record C by applying transitive linking. When server 104 or server 106 match and link two or more records together using illustrative embodiments, this group of linked records forms an entity.

When server 104 or server 106 compares and links two records (e.g., record A and record B) using illustrative embodiments, either entity formation, entity expansion, or entity coalescence takes place. For example, if the two records are not already part of any existing entity, then illustrative embodiments link these two records together and form an entity with these two records. This process is entity formation or creation. If only one record (e.g., record A) is already part of an existing entity (e.g., entity X), then illustrative embodiments link record A and record B together and accept record B as part of the same entity (i.e., entity X). This process is entity expansion. If both of the records (e.g., record A and record B) are already part of existing, but different entities (e.g., record A is part of entity X and record B is part of entity Y), then illustrative embodiments link these two records together and coalesce the two preexisting entities into a new aggregate entity (e.g., aggregate entity X,Y). This process is entity coalescence.

Transitive linking provides a way to identify similarity between records without comparing all of the records together. However, applying the transitive linking property based on similarity between records, but not on an exact matching between records, can cause issues. For example, by continuing to link similar records together into one entity, one exceptionally large entity can be created in terms of size (i.e., number of records the entity contains). As a result, a high probability exists that when two randomly picked records from that large-sized entity are compared, those two records will be determined to be quite different from each other and that those two records should not have been placed in the same entity.

Illustrative embodiments avoid creation of these large-sized heterogeneous entities, which are formed by the transitive linking of similar records and typically contain records that are not similar in a one-to-one comparison. For example, instead of utilizing one global auto-link-threshold value to link records to form all entities as current data management-based solutions do, illustrative embodiments utilize an entity-based, local auto-link-threshold value for each respective entity. An auto-link-threshold value indicates whether two records should be linked or not. For example, if a comparison score of two records is greater than or equal to the auto-link-threshold value, then the two records should be linked. Conversely, if the comparison score of the two records is less than the auto-link-threshold value, then the two records should not be linked.

Illustrative embodiments start the record comparison process using, for example, a default auto-link-threshold value, which is determined by the subscribing customer that owns the data records based on distribution of the data records using any statistical method. During initial formation of an entity, illustrative embodiments utilize the default auto-link-threshold value as the local auto-link-threshold value for that particular entity. Afterward, when illustrative embodiments add a record to that particular entity, illustrative embodiments adjust or increase the local auto-link-threshold value corresponding to that particular entity by an amount determined by the comparison score, which illustrative embodiments generate while comparing attributes of the entering record with attributes of another record that is a member of that particular entity and chosen by the data management-based solution as a candidate for comparison and the self-score of a center record member of that same entity. The center record member of a given entity is the record having a highest self-score value. Illustrative embodiments determine a self-score value of a record by comparing that record to itself. In other words, a record having a higher number of exact matching attributes, will have a higher self-score.

Client 110, client 112, and client 114 also connect to network 102. Clients 110, 112, and 114 are client devices of server 104 and server 106. Clients 110, 112, and 114 correspond to a set of subscribing customers. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users of clients 110, 112, and 114 may utilize clients 110, 112, and 114 to access and utilize the data management services provided by server 104 and server 106.

Storage 108 is a network storage device capable of storing any type of data in a structured format or an unstructured format. The data corresponds to a subscribing customer and may correspond to any data domain, such as, for example, a business data domain, a financial data domain, a healthcare data domain, an educational data domain, an entertainment data domain, an insurance data domain, a governmental data domain, or the like. In addition, storage 108 may represent a plurality of network storage devices corresponding to a plurality of different subscribing customers. Server 104 and server 106 manage the data stored in storage 108.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the records linking processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores records linking manager 218. However, it should be noted that even though records linking manager 218 is illustrated as residing in persistent storage 208, in an alternative illustrative embodiment records linking manager 218 may be a separate component of data processing system 200. For example, records linking manager 218 may be a hardware component coupled to communication fabric 202 or a combination of hardware and software components.

Records linking manager 218 controls the process of dynamically linking records using a local auto-link-threshold value of each respective entity. Upon initiation of the records matching and linking process, records linking manager 218 retrieves initial default auto-link-threshold value 220. Initial default auto-link-threshold value 220 is set by the subscribing customer corresponding to records 222. The subscribing customer determines initial default auto-link-threshold value 220 based on, for example, distribution of records 222 using any statistical method. Records 222 represent a plurality of data records from a plurality of data record sources corresponding to the subscribing customer. Records 222 are comprised of attributes 224. Attributes 224 represent a set of characteristics or properties associated with a given data record in records 222. Attributes 224 of a given data record may include, for example, at least one of name, address, social security number, telephone number, credit card number, date of birth, age, consumer credit score, and the like.

Records linking manager 218 utilizes initial default auto-link-threshold value 220 to determine whether compared record pair 226 of records 222 should be linked to form an entity or not. Compared record pair 226 represents any two records of records 222 that records linking manager 218 has compared attributes of the two records. Based on comparing the attributes of the two records, records linking manager 218 generates comparison score 228. Comparison score 228 indicates the level or degree of attribute matching between compared record pair 226.

In response to generating comparison score 228, records linking manager 218 determines whether comparison score 228 is greater than or equal to initial default auto-link-threshold value 220. If records linking manager 218 determines that comparison score 228 is less than initial default auto-link-threshold value 220, then records linking manager 218 does not link the two records corresponding to compared record pair 226. However, if records linking manager 218 determines that comparison score 228 is greater than or equal to initial default auto-link-threshold value 220, then records linking manager 218 links the two records corresponding to compared record pair 226 to form entity 230. In addition, records linking manager 218 utilizes initial default auto-link-threshold value 220 as local auto-link-threshold value 232 for entity 230.

Subsequently, records linking manager 218 retrieves a pair of records of records 222 for comparison. One of the pair of records is record 234 and the other record is already a member of entity 230. Records linking manager 218 determines whether record 234 of the pair of records for comparison is already part of another existing entity. If records linking manager 218 determines that record 234 is not part of any existing entity and that the comparison score for record 234 and the record that is already a member of entity 230 is greater than or equal to local auto-link-threshold value 232 corresponding to entity 230, then records linking manager 218 links record 234 with the compared record member of entity 230 and adds record 234 to entity 230. Further, records linking manager 218 adjusts local auto-link-threshold value 232 by increasing local auto-link-threshold value 232 based on the comparison score of record 234 and the compared self-score center member of the entity 230 to form adjusted local auto-link-threshold value 236 for entity 230. As a result, adjusted local auto-link-threshold value 236 now only allows stronger matching records to be added to entity 230.

If records linking manager 218 determines that record 234 is part of another existing entity and that the comparison score for record 234 and the compared record member of other entity 230 is greater than or equal to local auto-link-threshold value 232 corresponding to entity 230, then records linking manager 218 links the pair of records together and coalesces the other entity corresponding to record 234 with entity 230 to form aggregate entity 238. Further, records linking manager 218 utilizes the highest local auto-link-threshold value of the two coalesced entities as new local auto-link-threshold value 240 for aggregate entity 238.

As a result, data processing system 200 operates as a special purpose computer system in which records linking manager 218 in data processing system 200 enables the dynamic linking of matching records using a local auto-link-threshold value of each respective entity of a plurality of different entities within records 222. In particular, records linking manager 218 transforms data processing system 200 into a special purpose computer system as compared to currently available general computer systems that do not have records linking manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity, Bluetooth® technology, global system for mobile communications, code division multiple access, second-generation, third-generation, fourth-generation, fourth-generation Long Term Evolution, Long Term Evolution Advanced, fifth-generation, or any other wireless communication technology or standard to establish a wireless communications link for data processing system 200. Bluetooth is a registered trademark of Bluetooth Sig, Inc., Kirkland, Washington.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 242 is located in a functional form on computer-readable media 244 that is selectively removable and may be loaded onto or transferred to data processing system 200 for running by processor unit 204. Program code 242 and computer-readable media 244 form computer program product 246. In one example, computer-readable media 244 may be computer-readable storage media 248 or computer-readable signal media 250.

In these illustrative examples, computer-readable storage media 248 is a physical or tangible storage device used to store program code 242 rather than a medium that propagates or transmits program code 242. Computer-readable storage media 248 may include, for example, an optical or magnetic disc that is inserted or placed into a drive or other device that is part of persistent storage 208 for transfer onto a storage device, such as a hard drive, that is part of persistent storage 208. Computer-readable storage media 248 also may take the form of a persistent storage, such as a hard drive, a thumb drive, or a flash memory that is connected to data processing system 200.

Alternatively, program code 242 may be transferred to data processing system 200 using computer-readable signal media 250. Computer-readable signal media 250 may be, for example, a propagated data signal containing program code 242. For example, computer-readable signal media 250 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 244" can be singular or plural. For example, program code 242 can be located in computer-readable media 244 in the form of a single storage device or system. In another example, program code 242 can be located in computer-readable media 244 that is distributed in multiple data processing systems. In other words, some instructions in program code 242 can be located in one data processing system while other instructions in program code 242 can be located in one or more other data processing systems. For example, a portion of program code 242 can be located in computer-readable media 244 in a server computer while another portion of program code 242 can be located in computer-readable media 244 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 242.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Current data management-based solutions work with customer data, perform indexing, and match and link data records from different sources (e.g., customer relationship management data sources, consumer credit report sources, customer sales and marketing data sources, online shopping data sources, product production data sources, personnel data sources, and the like) to generate a complete view of the customer's data. Matching pairs of records requires comparing different record attributes (e.g., names, addresses, identifiers, and the like) of each pair of records to determine whether the records match and whether the records should be linked based on a series of mathematically-derived statistical probabilities and complex weight tables.

Record attribute comparison functions check for a variety of matching conditions such as exact, edit distance, N-GRAM, phonetic, or partial matching. Scores are generated based on the outcome of these comparisons and subscores from each attribute are combined based on statistically determined relative weights. Using statistically-defined thresholds, pairs of records are considered as matched, unmatched, or indeterminant to be sent for clerical review.

Record matching processes of current data management-based solutions utilize a static, global auto-link-threshold value for determining whether to link two compared records or not. For example, if a comparison score of two records is greater than the global auto-link-threshold value, then the two records are determined to be a "match" and are assigned to an entity. However, illustrative embodiments utilize a concept of "impurity" within an entity when a record enters that particular entity. For example, illustrative embodiments consider an entity to be "pure" when that entity has only one record member or when all record members within that entity have attributes that match exactly. For example, if entity X contains record A and record B, and the attributes of record A exactly match the attributes of record B, then illustrative embodiments consider entity X to be a pure entity. Conversely, if entity Y contains record C and record D, and the attributes of record C do not exactly match the attributes of record D, then illustrative embodiments consider entity Y to be an impure entity. Impurity, as used herein, is a measure of the amount of difference between attributes of the records present within an entity.

Consequently, whenever illustrative embodiments compare and match a record with another record in a particular entity and place the matching record in that particular entity, the placement of that record within that entity may introduce an amount of impurity within that entity. Because the entity experiences some impurity within itself, the entity tries to resist introduction of more impurity by avoiding similar kinds of records entering that entity. To avoid similar kinds of records from entering the entity, illustrative embodiments adjust the local auto-link-threshold value of that entity by increasing the local auto-link-threshold value of that entity by a calculated amount. As a result, illustrative embodiments only allow strongly matching records to be included in that particular entity in the future.

Because illustrative embodiments utilize an entity-based, local auto-link-threshold value, illustrative embodiments utilize a set of equations to adjust the local auto-link-threshold value of each respective entity in response to illustrative embodiments placing a record in that particular entity. Upon formation of each respective entity, illustrative embodiments set the local auto-link-threshold value of each entity to a default auto-link-threshold value, which the customer determines using a statistics method at the beginning of the record matching process. Then, illustrative embodiments adjust the default auto-link-threshold value according to one of three use cases.

Entity formation is the first use case. During formation of an entity (e.g., when illustrative embodiments match two standalone records), illustrative embodiments adjust the default auto-link-threshold value utilizing the following equation:

$$\lambda_X = \lambda_G + \gamma \log_a(SS_{CX} - CS_t).$$

X identifies the entity (e.g., entity name, identifier, or the like), $\lambda_X$ is the local auto-link-threshold value of that entity, $\lambda_G$ is the default auto-link-threshold value, $SS_{CX}$ is the self-score of the center record member of that entity, i identifies the entering record, and $CS_t$ is the comparison score between the entering record and the other record member of that entity. The quantity $(SS_{CX} - CS_i)$ represents the amount of impurity that the entering record i will introduce in that entity after becoming part of that entity. The parameter $\gamma$ is described in the second use case below.

Entity expansion is the second use case. During expansion of an existing entity (e.g., when illustrative embodiments match a record to another record that is already a part of that entity), illustrative embodiments adjust or update the current local auto-link-threshold value of that entity utilizing the following equation:

$$\lambda_X = \lambda_X + \gamma \log_a(SS_C - CS_i).$$

In this second use case, when illustrative embodiments match the two records and one record is already a part of that entity, illustrative embodiments make the standalone entering record part of that entity since that entity already exists and contains at least two records. The parameter $\gamma$ controls the amount of the impurity penalty that illustrative embodiments add to the local auto-link-threshold value of that particular entity. In other words, the parameter $\gamma$ increases the local auto-link-threshold value of that particular entity. The parameter $\gamma$ is a global hyperparameter that the customer sets before the record matching process begins. The parameter $\gamma$ controls the rate at which the local auto-link-threshold value of a particular entity increases. The value of the parameter $\gamma$ ranges between zero (0) and one (1) and can be set per the need of the user.

Entity coalescence is the third use case. During coalescence of existing entities (e.g., when illustrative embodiments match two records that are already present in two different entities), illustrative embodiments adjust the local auto-link-threshold value of the aggregate entity utilizing the following equation:

$$\lambda_{XY} = \max_{\lambda_i < \lambda_{max}} (\lambda_X, \lambda_Y).$$

In this third use case, when illustrative embodiments match two records from different entities, illustrative embodiments coalesce the two entities corresponding to the matched records to form one aggregate or combined entity. In addition, when combining the separate two entities to form the aggregate entity, illustrative embodiments utilize the highest of the two local auto-link-threshold values corresponding to the two entities as the local auto-link-threshold value for that aggregate entity. X and Y identify the two entities and $\lambda_{max}$ defines a maximum limit or cap on the growth of the local auto-link-threshold value of that aggregate entity. In other words, the local auto-link-threshold value of that aggregate entity can increase until $\lambda_{max}$, which is a global parameter, is reached or met. Thus, when the local auto-link-threshold value of that aggregate entity equals $\lambda_{max}$, illustrative embodiments do not allow the size of that aggregate entity to increase any further. In each of these three use cases above, illustrative embodiments keep updating the local auto-link-threshold value of each respective entity whenever a new record enters a given entity.

Thus, illustrative embodiments provide one or more technical solutions that overcome a technical problem with transitive linking using the same static, global auto-link-threshold value for all entities in data record storage. As a result, these one or more technical solutions provide a technical effect and practical application in the field of data management.

Figure 3:
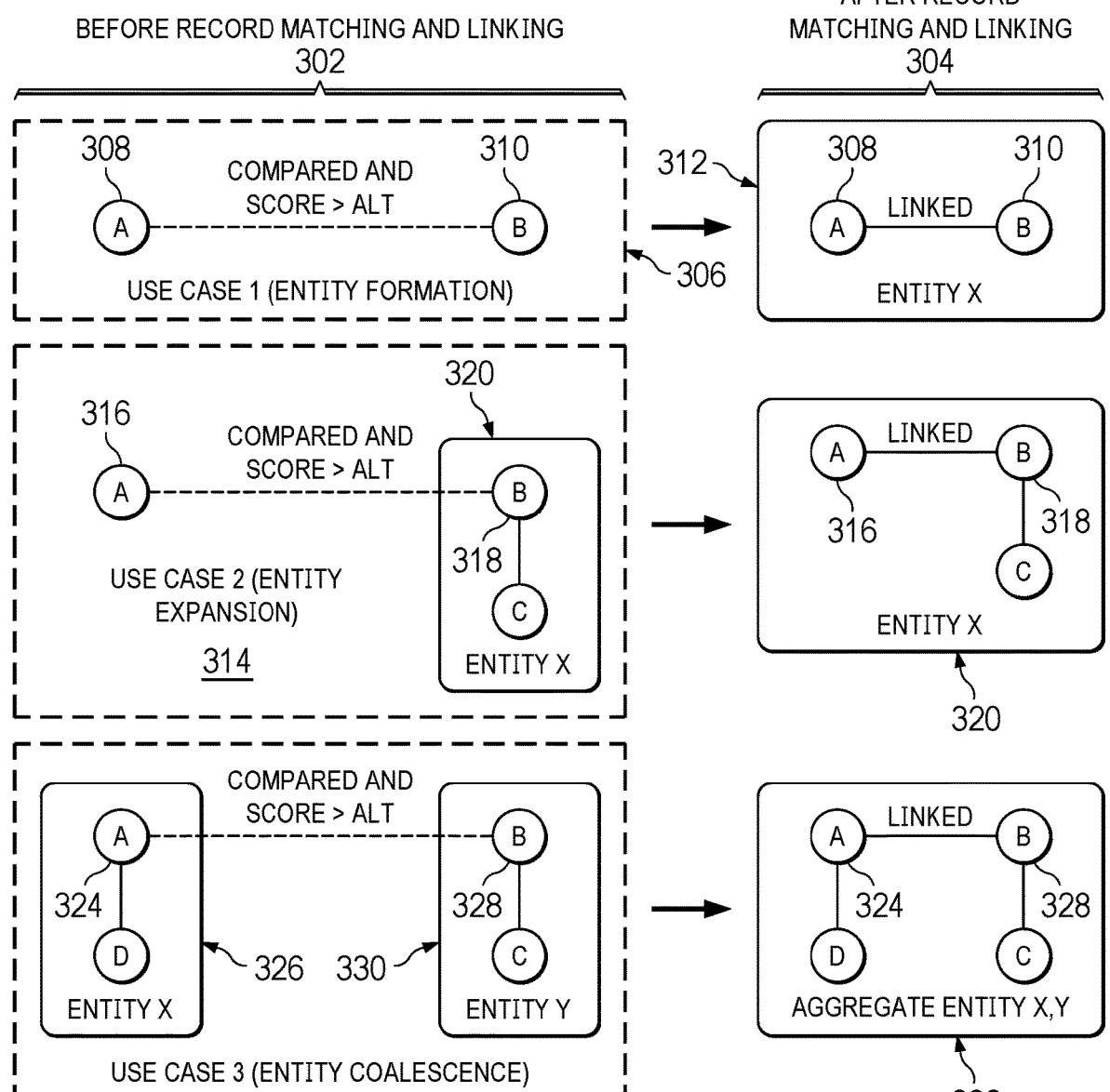
FIG. 3 is a diagram illustrating an example of entity formation, expansion, and coalescence processes in accordance with an illustrative embodiment.
Figure 4A:
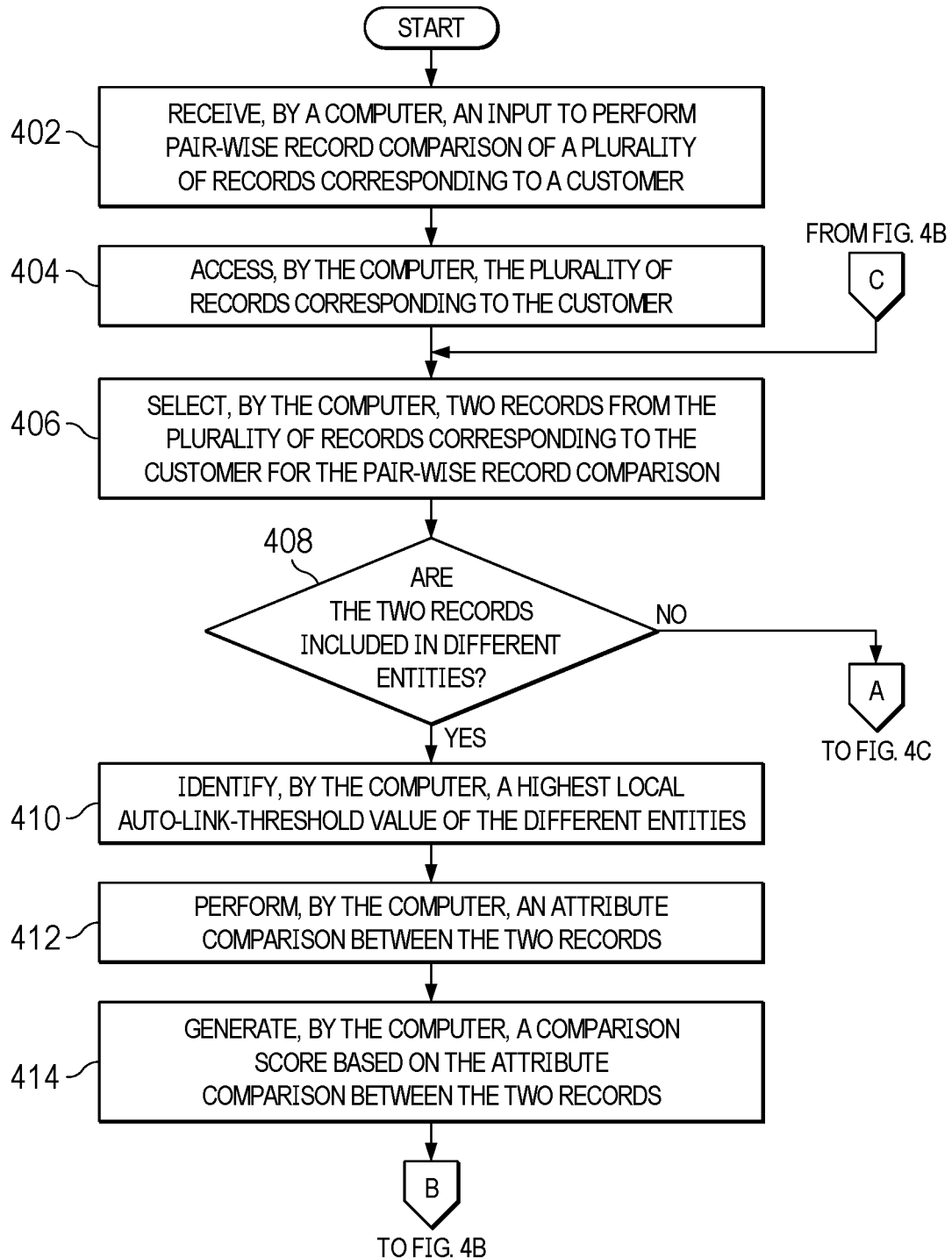
FIGS. 4A-4D are a flowchart illustrating a process for records linking in accordance with an illustrative embodiment.
Figure 4B:
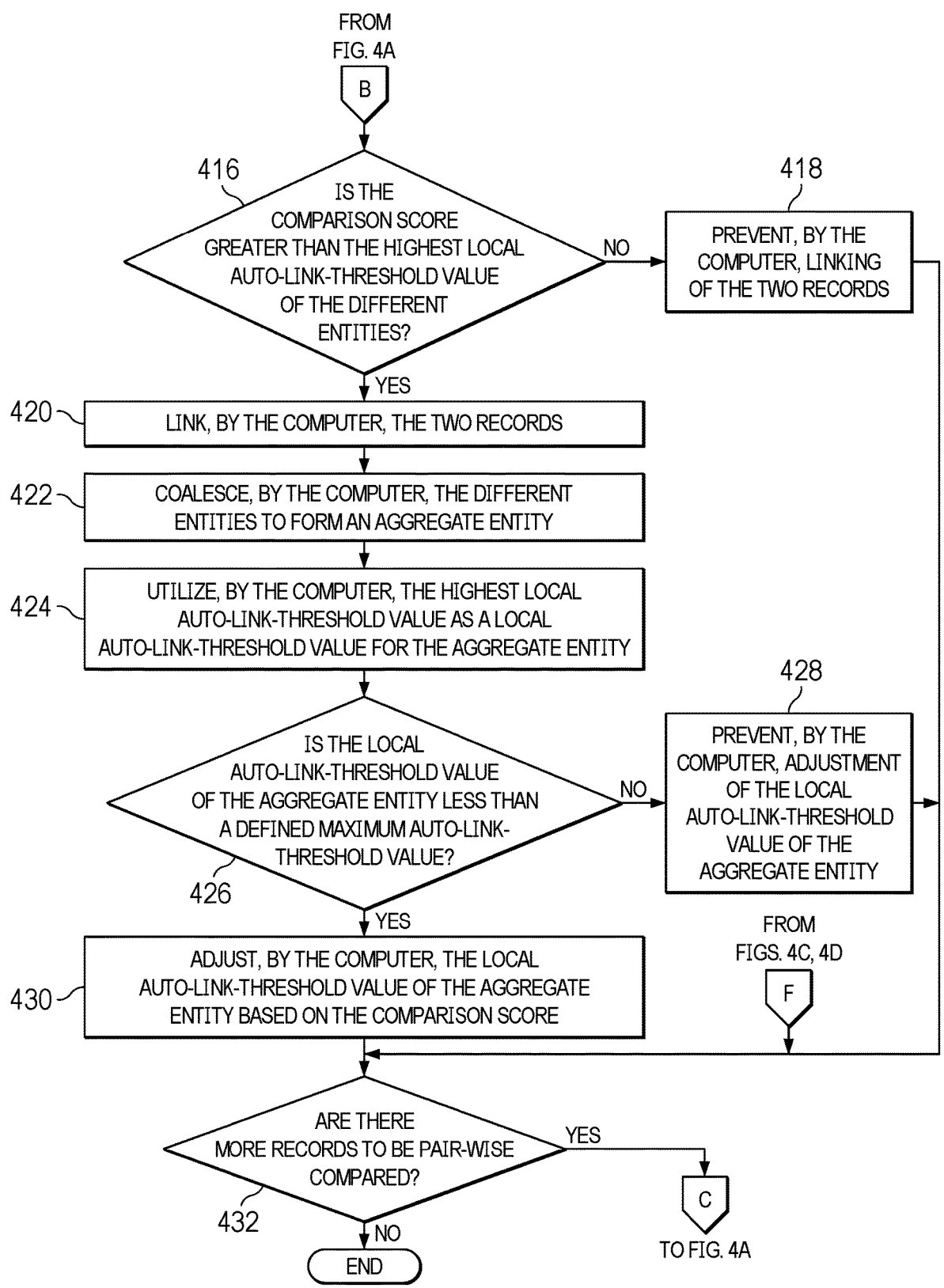
Figure 4C:
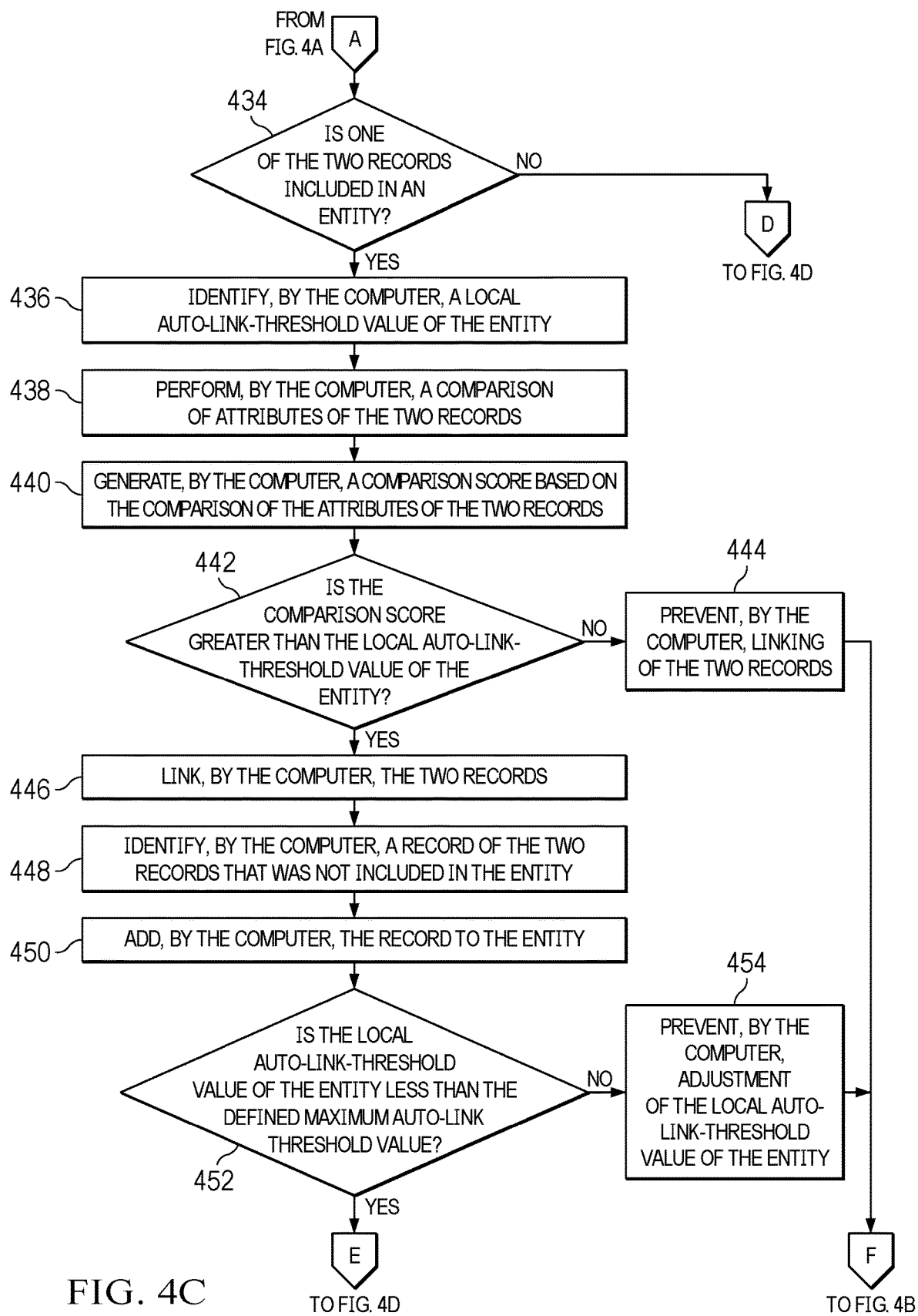
Figure 4D:
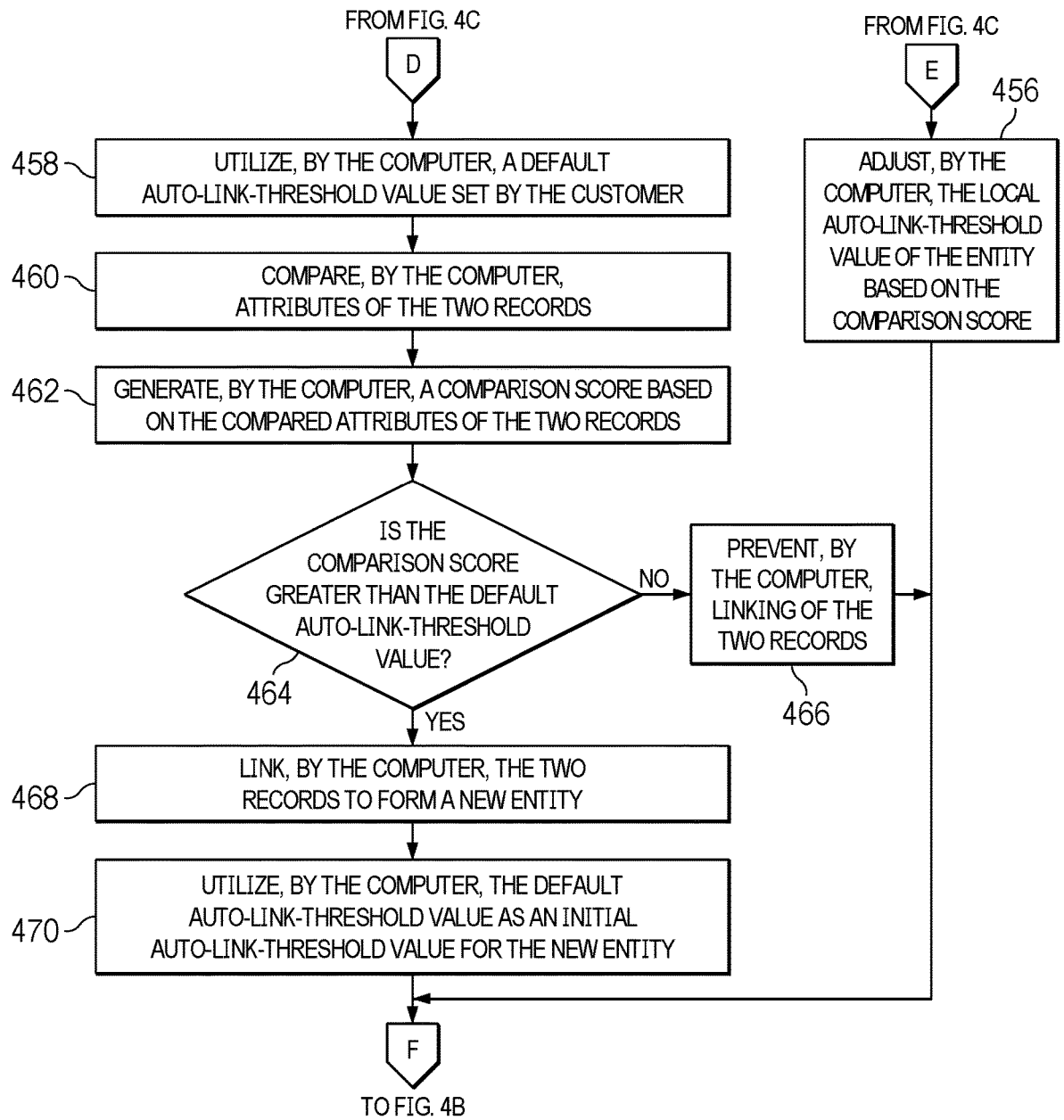

With reference now to FIG. 3, a diagram illustrating an example of entity formation, expansion, and coalescence processes is depicted in accordance with an illustrative embodiment. Entity formation, expansion, and coalescence processes 300 may be implemented in a computer, such as, for example, server 104 in FIG. 1 or data processing system 200 in FIG. 2. For example, entity formation, expansion, and coalescence processes 300 may be implemented in records linking manager 218 in FIG. 2.

In this example, entity formation, expansion, and coalescence processes 300 include before record matching and linking 302 and after record matching and linking 304. At use case 1 (entity formation) 306 in before record matching and linking 302, the record linking manager compared the attributes of record A 308 with the attributes of record B 310 and determined that the comparison score was greater than the initial default auto-link-threshold value set by the subscribing customer. As a result, in after record matching and linking 304, the record linking manager has linked record A 308 with record B 310 to form entity X 312.

At use case 2 (entity expansion) 314 in before record matching and linking 302, the record linking manager compared the attributes of record A 316 with the attributes of record B 318, which is already part of existing entity X 320, and determined that the comparison score was greater than the local auto-link-threshold value of entity X 320. As a result, in after record matching and linking 304, the record linking manager has linked record A 316 with record B 318 and added record A 316 to entity X 320.

At use case 3 (entity coalescence) 322 in before record matching and linking 302, the record linking manager compared the attributes of record A 324, which is already part of existing entity X 326, with the attributes of record B 328, which is already part of existing entity Y 330, and determined that the comparison score was greater than the highest local auto-link-threshold value between entity X 326 and entity Y 330. As a result, in after record matching and linking 304, the record linking manager has linked record A 324 with record B 328 and coalesced entity X 326 and entity Y 330 to form aggregate entity X,Y 332.

With reference now to FIGS. 4A-4D, a flowchart illustrating a process for records linking is shown in accordance with an illustrative embodiment. The process shown in FIGS. 4A-4D may be implemented in a computer, such as, for example, server 104 in FIG. 1 or data processing system 200 in FIG. 2. For example, the process shown in FIGS. 4A-4D may be implemented in records linking manager 218 in FIG. 2.

The process begins when the computer receives an input to perform pair-wise record comparison of a plurality of records corresponding to a customer (step 402). In response to receiving the input to perform the pair-wise record comparison, the computer accesses the plurality of records corresponding to the customer (step 404). The plurality of records may be located in records storage, such as, for example, storage 108 in FIG. 1 or persistent storage 208 in FIG. 2.

In response to accessing the plurality of records, the computer selects two records from the plurality of records corresponding to the customer for the pair-wise record comparison (step 406). The computer makes a determination as to whether the two records are included in different entities (step 408). For example, the computer determines whether one record of the two records (e.g., record A) is included in one entity (e.g., entity X) and the other record of the two records (e.g., record B) is included in a different entity (e.g., entity Y).

If the computer determines that the two records are included in different entities, yes output of step 408, then the computer identifies a highest local auto-link-threshold value of the different entities (step 410). In other words, the computer selects the local auto-link-threshold value corresponding to the entity of the two different entities that is greater than the local auto-link-threshold value of the other entity. In addition, the computer performs an attribute comparison between the two records (step 412). Further, the computer generates a comparison score based on the attribute comparison between the two records (step 414).

The computer makes a determination as to whether the comparison score is greater than the highest local auto-link-threshold value of the different entities (step 416). If the computer determines that the comparison score is not greater than the highest local auto-link-threshold value of the different entities, no output of step 416, then the computer prevents linking of the two records (step 418). Thereafter, the process proceeds to step 432. If the computer determines that the comparison score is greater than the highest local auto-link-threshold value of the different entities, yes output of step 416, then the computer links the two records (step 420).

Moreover, the computer coalesces the different entities to form an aggregate entity (step 422). The computer also utilizes the highest local auto-link-threshold value as a local auto-link-threshold value for the aggregate entity (step 424).

Afterward, the computer makes a determination as to whether the local auto-link-threshold value of the aggregate entity is less than a defined maximum auto-link-threshold value (step 426). If the computer determines that the local auto-link-threshold value of the aggregate entity is not less than the defined maximum auto-link-threshold value, no output of step 426, then the computer prevents adjustment of the local auto-link-threshold value of the aggregate entity (step 428). Thereafter, the process proceeds to step 432. If the computer determines that the local auto-link-threshold value of the aggregate entity is less than the defined maximum auto-link-threshold value, yes output of step 426, then the computer adjusts the local auto-link-threshold value of the aggregate entity based on the comparison score (step 430).

Subsequently, the computer makes a determination as to whether there are more records in the plurality of records to be pair-wise compared (step 432). If the computer determines that there are more records in the plurality of records to be pair-wise compared, yes output of step 432, then the process returns to step 406 where the computer selects two more records for comparison. If the computer determines that there are no more records in the plurality of records to be pair-wise compared, no output of step 432, then the process terminates thereafter.

Returning again to step 408, if the computer determines that the two records are not included in different entities, no output of step 408, then the computer makes a determination as to whether one of the two records is included in an entity (step 434). If the computer determines that one of the two records is included in an entity, yes output of step 434, then the computer identifies a local auto-link-threshold value of the entity (step 436). In addition, the computer performs a comparison of attributes of the two records (step 438). Further, the computer generates a comparison score based on the comparison of the attributes of the two records (step 440).

Afterward, the computer makes a determination as to whether the comparison score is greater than the local auto-link-threshold value of the entity (step 442). If the computer determines that the comparison score is not greater than the local auto-link-threshold value of the entity, no output of step 442, then the computer prevents linking of the two records (step 444). Thereafter, the process returns to step 432 where the computer determines whether there are more records to be pair-wise compared. If the computer determines that the comparison score is greater than the local auto-link-threshold value of the entity, yes output of step 442, then the computer links the two records (step 446). Furthermore, the computer identifies a record of the two records that was not included in the entity (step 448). Moreover, the computer adds the record to the entity (step 450).

The computer also makes a determination as to whether the local auto-link-threshold value of the entity is less than the defined maximum auto-link-threshold value (step 452). If the computer determines that the local auto-link-threshold value of the entity is not less than the defined maximum auto-link-threshold value, no output of step 452, then the computer prevents adjustment of the local auto-link-threshold value of the entity (step 454). Thereafter, the process returns to step 432 where the computer determines whether there are more records to be pair-wise compared. If the computer determines that the local auto-link-threshold value of the entity is less than the defined maximum auto-linkthreshold value, yes output of step 452, then the computer adjusts the local auto-link-threshold value of the entity based on the comparison score (step 456). Thereafter, the process returns to step 432 where the computer determines whether there are more records to be pair-wise compared.

Returning again to step 434, if the computer determines that neither of the two records is included in an entity, no output of step 434, then the computer utilizes a default auto-link-threshold value set by the customer (step 458). The computer compares attributes of the two records (step 460). The computer generates a comparison score based on the compared attributes of the two records (step 462).

Afterward, the computer makes a determination as to whether the comparison score is greater than the default auto-link-threshold value (step 464). If the computer determines that the comparison score is not greater than the default auto-link-threshold value, no output of step 464, then the computer prevents linking of the two records (step 466). Thereafter, the process returns to step 432 where the computer determines whether there are more records to be pair-wise compared. If the computer determines that the comparison score is greater than the default auto-link-threshold value, yes output of step 464, then the computer links the two records to form a new entity (step 468). In addition, the computer utilizes the default auto-link-threshold value as an initial auto-link-threshold value for the new entity (step 470). Thereafter, the process returns to step 432 where the computer determines whether there are more records to be pair-wise compared.

Thus, illustrative embodiments of the present invention provide a computer-implemented method, computer system, and computer program product for dynamically linking records using a local auto-link-threshold value of each respective entity. In other words, illustrative embodiments provide dynamic threshold-based entity resolution by utilizing an entity-based local auto-link-threshold value for each respective entity. Illustrative embodiments start the record matching process utilizing a default auto-link-threshold value that the customer determines via a statistical method. Illustrative embodiments utilize the default auto-link-threshold value as the local auto-link-threshold value after initial formation of an entity. In addition, illustrative embodiments enable proactive control of large entity formation using dynamic local auto-link-threshold values. Illustrative embodiments base the dynamic local auto-link-threshold value determination on the amount of impurity added to an entity by a newly entering record. As a result, illustrative embodiments provide an entity-based local auto-link-threshold value for each respective entity of a plurality of entities instead of utilizing a global auto-link-threshold value in order to avoid the creation of large heterogeneous entities formed by transitive linking of similar records.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for records linking, the computer-implemented method comprising:

accessing, by a computer in response to the computer receiving an input to perform a pair-wise record comparison of a plurality of records corresponding to a customer in a data management system from a plurality of data record sources, the plurality of records from the plurality of data record sources to generate a complete view of data records of the customer;

selecting, by the computer, two records from the plurality of records from the plurality of data record sources corresponding to the customer in the data management system for the pair-wise record comparison;

determining, by the computer, whether the two records are included in different entities such that a first record of the two records is included in a first entity and a second record of the two records is included in a second entity of the different entities;

identifying, by the computer, a highest entity-based local auto-link-threshold value between the first entity and the second entity of the different entities in response to the computer determining that the two records are included in the different entities, wherein each respective entity in the data management system has its own entity-based local auto-link-threshold value;

performing, by the computer, an attribute comparison between the two records;

generating, by the computer, a comparison score based on the attribute comparison between the two records;

determining, by the computer, whether the comparison score is greater than the highest entity-based local auto-link-threshold value between the first entity and the second entity of the different entities;

linking, by the computer, the two records in response to the computer determining that the comparison score is greater than the highest entity-based local auto-link-threshold value between the first entity and the second entity of the different entities; and selecting, by the computer in response to the computer determining that there are more records in the plurality of records from the plurality of data record sources to be pair-wise compared, two more records from the plurality of records to continue the pair-wise record comparison of the plurality of records until the complete view of the data records of the customer is generated.

2. The computer-implemented method of claim 1, further comprising:

preventing, by the computer, the linking of the two records in response to the computer determining that the comparison score is not greater than the highest entity-based local auto-link-threshold value between the first entity and the second entity of the different entities.

3. The computer-implemented method of claim 1 further comprising:

coalescing, by the computer, the different entities to form an aggregate entity; and utilizing, by the computer, the highest entity-based local auto-link-threshold value between the first entity and the second entity as an entity-based local auto-link-threshold value for the aggregate entity.

4. The computer-implemented method of claim 3 further comprising:

determining, by the computer, whether the entity-based local auto-link-threshold value of the aggregate entity is less than a defined maximum entity-based auto-link-threshold value; and increasing, by the computer in response to the computer determining that the entity-based local auto-link-threshold value of the aggregate entity is less than the defined maximum entity-based auto-link-threshold value, the entity-based local auto-link-threshold value of the aggregate entity whenever an entering record is added to the aggregate entity to only allow stronger matching records to be added to the aggregate entity based on subtracting a generated comparison score of the entering record from a self-score of a center record of the aggregate entity and multiplying that difference by a hyperparameter that controls a rate at which the entity-based local auto-link-threshold value of the aggregate entity increases.

5. The computer-implemented method of claim 4 further comprising:
preventing, by the computer, the increasing of the entity-based local auto-link-threshold value of the aggregate entity in response to the computer determining that the entity-based local auto-link-threshold value of the aggregate entity is not less than the defined maximum entity-based auto-link-threshold value.

6. The computer-implemented method of claim 1 further comprising:
determining, by the computer in response to the computer determining that the two records are not included in the different entities, whether one of the two records is included in a given entity in the data management system;
identifying, by the computer in response to the computer determining that the one of the two records is included in the given entity, a particular entity-based local auto-link-threshold value of the given entity;
determining, by the computer, whether the comparison score is greater than the particular entity-based local auto-link-threshold value of the given entity;
linking, by the computer, the two records in response to the computer determining that the comparison score is greater than the particular entity-based local auto-link-threshold value of the given entity; and
terminating, by the computer in response to determining that there are no more records in the plurality of records from the plurality of data record sources to be pair-wise compared, the pair-wise record comparison of the plurality of records from the plurality of data record sources corresponding to the customer in the data management system when the complete view of the data records of the customer is generated.

7. The computer-implemented method of claim 6 further comprising:
identifying, by the computer, a particular record of the two records that was not included in the given entity; and
adding, by the computer, the particular record to the given entity.

8. The computer-implemented method of claim 6 further comprising:
utilizing, by the computer, a default entity-based auto-link-threshold value set by the customer in response to the computer determining that neither of the two records is included in any existing entity in the data management system;
determining, by the computer, whether the comparison score is greater than the default entity-based auto-link-threshold value; and
linking, by the computer, the two records to form a new entity in response to the computer determining that the comparison score is greater than the default entity-based auto-link-threshold value.

9. The computer-implemented method of claim 8 further comprising:
utilizing, by the computer, the default entity-based auto-link-threshold value as an initial entity-based auto-link-threshold value for the new entity formed by linking the two records in response to the computer determining that the comparison score is greater than the default entity-based auto-link-threshold value.

10. A computer system for records linking, the computer system comprising:
a bus system;
a storage device connected to the bus system, wherein the storage device stores program instructions; and
a processor connected to the bus system, wherein the processor executes the program instructions to:
in response to receiving an input to perform a pair-wise record comparison of a plurality of records corresponding to a customer in a data management system from a plurality of data record sources, access the plurality of records from the plurality of data record sources to generate a complete view of data records of the customer;
select two records from the plurality of records from the plurality of data record sources corresponding to the customer in the data management system for the pair-wise record comparison;
determine whether the two records are included in different entities such that a first record of the two records is included in a first entity and a second record of the two records is included in a second entity of the different entities;
identify a highest entity-based local auto-link-threshold value between the first entity and the second entity of the different entities in response to determining that the two records are included in the different entities, wherein each respective entity in the data management system has its own entity-based local auto-link-threshold value;
perform an attribute comparison between the two records;
generate a comparison score based on the attribute comparison between the two records;
determine whether the comparison score is greater than the highest entity-based local auto-link-threshold value between the first entity and the second entity of the different entities;
link the two records in response to determining that the comparison score is greater than the highest entity-based local auto-link-threshold value between the first entity and the second entity of the different entities; and
in response to determining that there are more records in the plurality of records from the plurality of data record sources to be pair-wise compared, select two more records from the plurality of records to continue the pair-wise record comparison of the plurality of records until the complete view of the data records of the customer is generated.

11. The computer system of claim 10, wherein the processor further executes the program instructions to:
prevent the linking of the two records in response to determining that the comparison score is not greater than the highest entity-based local auto-link-threshold value between the first entity and the second entity of the different entities.

12. The computer system of claim 10, wherein the processor further executes the program instructions to:
coalesce the different entities to form an aggregate entity; and
utilize the highest entity-based local auto-link-threshold value between the first entity and the second entity as an entity-based local auto-link-threshold value for the aggregate entity.

13. The computer system of claim 12, wherein the processor further executes the program instructions to:
determine whether the entity-based local auto-link-threshold value of the aggregate entity is less than a defined maximum entity-based auto-link-threshold value; and
in response to determining that the entity-based local auto-link-threshold value of the aggregate entity is less than the defined maximum entity-based auto-link-threshold value, increase the entity-based local auto-link-threshold value of the aggregate entity whenever an entering record is added to the aggregate entity to only allow stronger matching records to be added to the aggregate entity based on subtracting a generated comparison score of the entering record from a self-score of a center record of the aggregate entity and multiplying that difference by a hyperparameter that controls a rate at which the entity-based local auto-link-threshold value of the aggregate entity increases.

14. A computer program product for records linking, the computer program product comprising a computer-readable storage medium having program instructions embodied therewith, the program instructions executable by a computer to cause the computer to perform a method of:
accessing, by a computer in response to the computer receiving an input to perform a pair-wise record comparison of a plurality of records corresponding to a customer in a data management system from a plurality of data record sources, the plurality of records from the plurality of data record sources to generate a complete view of data records of the customer;
selecting, by the computer, two records from the plurality of records from the plurality of data record sources corresponding to the customer in the data management system for the pair-wise record comparison;
determining, by the computer, whether the two records are included in different entities such that a first record of the two records is included in a first entity and a second record of the two records is included in a second entity of the different entities;
identifying, by the computer, a highest entity-based local auto-link-threshold value between the first entity and the second entity of the different entities in response to the computer determining that the two records are included in the different entities, wherein each respective entity in the data management system has its own entity-based local auto-link-threshold value;
performing, by the computer, an attribute comparison between the two records;
generating, by the computer, a comparison score based on the attribute comparison between the two records;
determining, by the computer, whether the comparison score is greater than the highest entity-based local auto-link-threshold value between the first entity and the second entity of the different entities;
linking, by the computer, the two records in response to the computer determining that the comparison score is greater than the highest entity-based local auto-link-threshold value between the first entity and the second entity of the different entities; and
selecting, by the computer in response to the computer determining that there are more records in the plurality of records from the plurality of data record sources to be pair-wise compared, two more records from the plurality of records to continue the pair-wise record comparison of the plurality of records until the complete view of the data records of the customer is generated.

15. The computer program product of claim 14 further comprising:
preventing, by the computer, the linking of the two records in response to the computer determining that the comparison score is not greater than the highest entity-based local auto-link-threshold value between the first entity and the second entity of the different entities.

16. The computer program product of claim 14 further comprising:
coalescing, by the computer, the different entities to form an aggregate entity; and
utilizing, by the computer, the highest entity-based local auto-link-threshold value between the first entity and the second entity as an entity-based local auto-link-threshold value for the aggregate entity.

17. The computer program product of claim 16 further comprising:
determining, by the computer, whether the entity-based local auto-link-threshold value of the aggregate entity is less than a defined maximum entity-based auto-link-threshold value; and
increasing, by the computer in response to the computer determining that the entity-based local auto-link-threshold value of the aggregate entity is less than the defined maximum entity-based auto-link-threshold value, the entity-based local auto-link-threshold value of the aggregate entity whenever an entering record is added to the aggregate entity to only allow stronger matching records to be added to the aggregate entity based on subtracting a generated comparison score of the entering record from a self-score of a center record of the aggregate entity and multiplying that difference by a hyperparameter that controls a rate at which the entity-based local auto-link-threshold value of the aggregate entity increases.

18. The computer program product of claim 17 further comprising:
preventing, by the computer, the increasing of the entity-based local auto-link-threshold value of the aggregate entity in response to the computer determining that the entity-based local auto-link-threshold value of the aggregate entity is not less than the defined maximum entity-based auto-link-threshold value.

19. The computer program product of claim 14 further comprising:
determining, by the computer in response to the computer determining that the two records are not included in the different entities, whether one of the two records is included in a given entity in the data management system;
identifying, by the computer in response to the computer determining that the one of the two records is included in the given entity, a particular entity-based local auto-link-threshold value of the given entity;
determining, by the computer, whether the comparison score is greater than the particular entity-based local auto-link-threshold value of the given entity;

linking, by the computer, the two records and adding another of the two records to the given entity in response to the computer determining that the comparison score is greater than the particular entity-based local auto-link-threshold value of the given entity; and terminating, by the computer in response to determining that there are no more records in the plurality of records from the plurality of data record sources to be pair-wise compared, the pair-wise record comparison of the plurality of records from the plurality of data record sources corresponding to the customer in the data management system when the complete view of the data records of the customer is generated.

20. The computer program product of claim 19 further comprising:

identifying, by the computer, a particular record of the two records that was not included in the given entity; and adding, by the computer, the particular record to the given entity.

* * * * *